(12) United States Patent
Yao et al.

(10) Patent No.: US 12,549,787 B1
(45) Date of Patent: Feb. 10, 2026

(54) ADHOC AGGREGATORS FOR DYNAMIC VIDEO PIPELINES

(71) Applicant: Amazon Technologies, Inc., Seattle, WA (US)

(72) Inventors: Xiao Kun Yao, Seattle, WA (US); Charles M. Cordova, Seattle, WA (US); Deepali Sharma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/887,879

(22) Filed: Sep. 17, 2024

(51) Int. Cl.
*H04N 21/238* (2011.01)
*H04N 21/2187* (2011.01)
*H04N 21/262* (2011.01)
*H04N 21/845* (2011.01)

(52) U.S. Cl.
CPC ....... *H04N 21/238* (2013.01); *H04N 21/2187* (2013.01); *H04N 21/26258* (2013.01); *H04N 21/8456* (2013.01)

(58) Field of Classification Search
CPC ............. H04N 21/238; H04N 21/2187; H04N 21/26258; H04N 21/8456
USPC ....................................................... 725/116
See application file for complete search history.

(56) References Cited

U.S. PATENT DOCUMENTS

2024/0340474 A1\* 10/2024 Loheide ........... H04N 21/23614

\* cited by examiner

*Primary Examiner* — Adil Ocak
(74) *Attorney, Agent, or Firm* — Weaver Austin Villeneuve & Sampson LLP

(57) ABSTRACT

Linear playout provides media content according to a schedule, including live events. Media pipelines for ingesting and providing live event content may be allocated and torn down before and after each live event. Allocating media pipelines for each live event in a season reduces computational resource consumption.

20 Claims, 6 Drawing Sheets

ADHOC AGGREGATORS FOR DYNAMIC VIDEO PIPELINES

BACKGROUND

Video content may be provided through a number of media, such as television and the Internet. Linear channels may be streamed in real time by providing manifests according to a schedule. Live events may be streamed over the internet through channels, including a series of live events such as a season of sports events. Various infrastructure may be configured for live events.

DETAILED DESCRIPTION

Figure 1A:
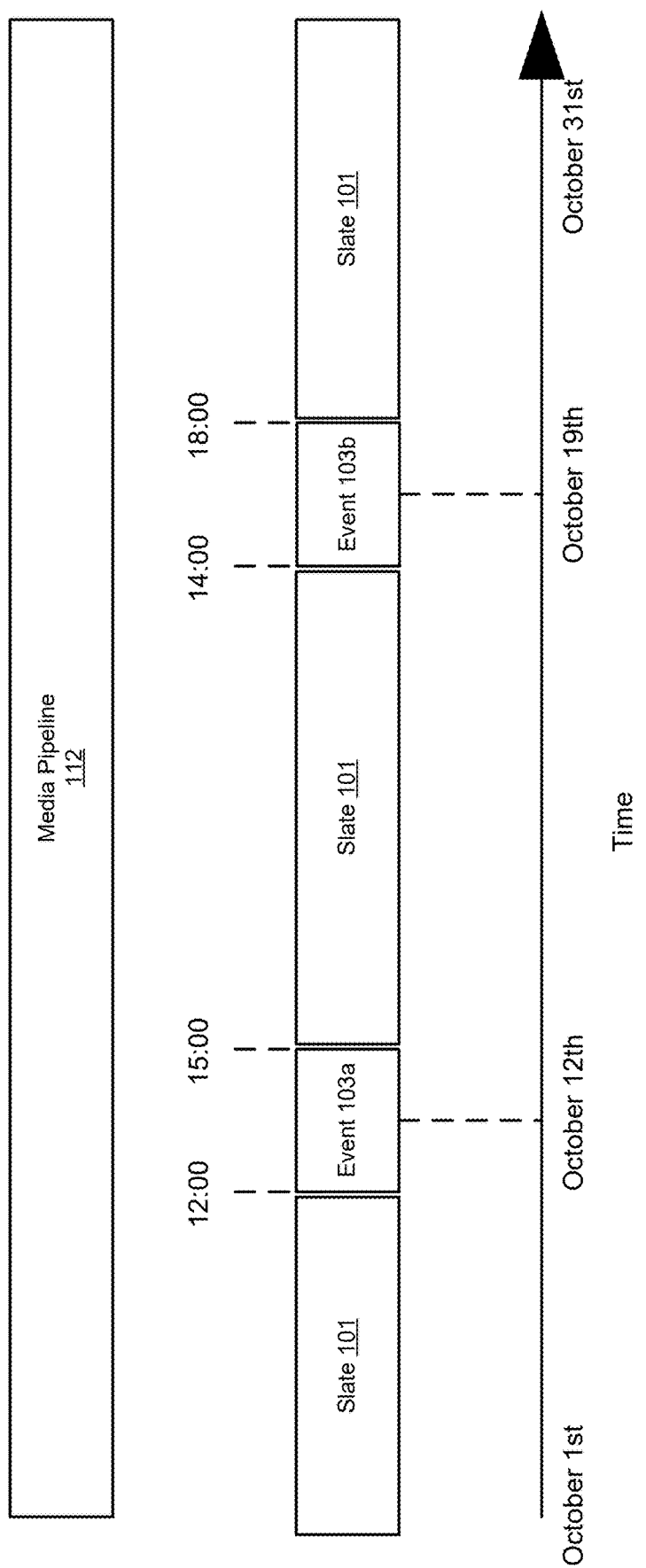
FIGS. 1A and 1B provide example embodiments of streaming ad hoc events.

This disclosure relates to techniques for providing live events, including as part of over the top (OTT) linear stations. When providing live event content, various resources and infrastructure are configured to ingest live event content from a content provider and then provide that content to viewers. These configurations may be generated ahead of the live event by a manual process. When the live event starts, a media pipeline receives a live feed from a content provider. The media pipeline handles transporting, transcoding, packaging, and delivering content to client devices for playback of the live event.

In the context of broadcasting and media production, "playout" refers to the process of delivering pre-recorded or live content to an audience. During playout, media content, such as live events, movies, or advertisements, is provided to playback devices through various distribution channels, including television networks and streaming platforms. Playout can involve both traditional broadcast methods and OTT digital delivery mechanisms. Linear playout refers to continuous delivery of scheduled content, typically via a plurality of channels or stations from which a user device may select.

A linear playout process for OTT station streaming may include scheduling, preparation, and provision of content for playback. Linear channels or stations may be scheduled, determining the content to be played on a station for a specific duration, e.g., a week or a month. The content may then be prepared and provided to clients, e.g., encoded, packaged, encrypted, etc. A live manifest may be provided to client devices, allowing client devices to request content for a specific station and begin playback of content according to the schedule for that station.

Live event streaming may be distinguished from typical VOD streaming. Live event streaming provides a live manifest that contains references for content at the live head of the stream. These references may be treated as a sliding window, where updated manifest data is provided to add new references and remove old references. When streaming a live event, the new references are the most recently encoded fragments.

Ad Hoc events are live events that are aggregated from various organizations or leagues, such as the NFL or the premier league, which may be made available to customers via a single channel. Ad Hoc events present challenges for streaming, as the schedules of the events may change or are unknown ahead of time (e.g., the end of a sporting event may depend on overtime or the pace of play). One option for streaming ad hoc events is to provide 24/7 infrastructure for receiving event content as part of a linear playout. For live sporting events played on linear content, e.g., 24/7 channels that may be streamed over-the-top (OOT), infrastructure for the live events may be configured at the start of a sports season and then reserved for a channel for the duration of the season, even during days when no live events are planned for streaming. This infrastructure may be used by a content provider at any time to stream a live event. However, this is inefficient as the infrastructure is kept available for use 24/7 despite a lack of continual use. When a live event is not streaming, the content provider may be required to provide content, e.g., slates, when a live event isn't playing. This consumes resources and requires partners to provide slating that is unlikely to be requested by client devices. Furthermore, the infrastructure is static such that all content received by the media pipeline must have the same configuration, e.g., the signal ingested by the media pipeline must be 1080P 30 FPS for all events. If the partner has different signals between events, then the signal must be normalized prior to being received by the media pipeline, which is undesirable.

Disclosed herein are techniques for providing infrastructure for ad hoc events that supports different configurations between ad hoc events. This may be accomplished by generating a media pipeline for each ad hoc event, rather than a single media pipeline for all ad hoc events. The media pipeline may be generated based on configuration information associated with the ad hoc event and the schedule of the ad hoc event. Thus, a media pipeline may be generated a few hours or days prior to an ad hoc event and then teardown of the media pipeline may occur based on the end of the ad hoc event. An example may be instructive.

Figure 1B:
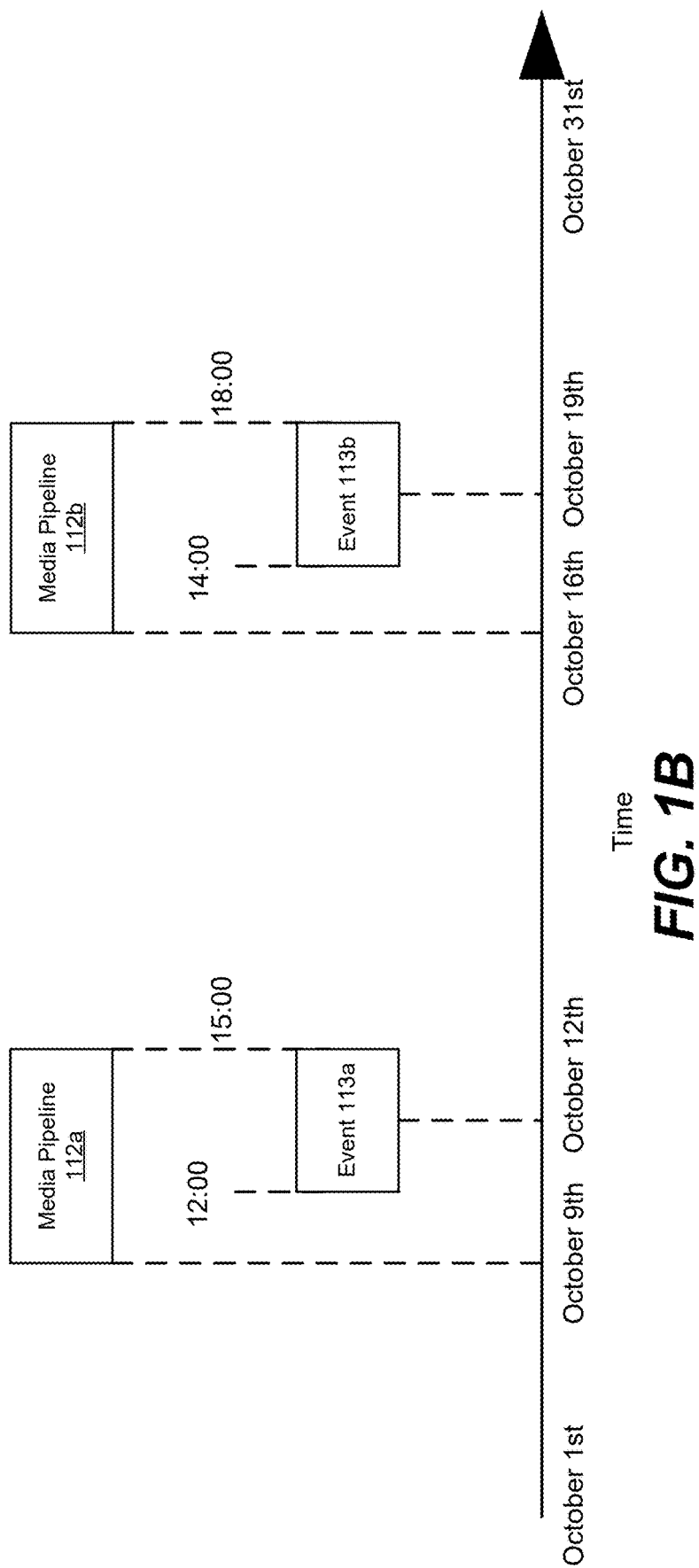

FIGS. 1A and 1B present two different methods of ingesting and providing ad hoc event content. In FIG. 1A, a media pipeline 112 is allocated for the entire month of October. While a single month is shown, media pipeline 112 may be allocated for an entire season, e.g., from September to January for the NFL. Two events 103a-b are scheduled for October in FIG. 1A, on the 12$^{th}$ and the 17$^{th}$. During the times of these events, a live feed is ingested by the media pipeline 112, providing streaming content of the live event for client devices to request and play back. Before and after the live events, slate content 101 is provided to the media pipeline. Slating may refer to placeholder content, for example, "this event has ended" or "commercial break in progress." Slating may be used to filled frames in a stream but is generally undesirable. In particular, slating between events for continuous days may waste resources, as the media pipeline 112 is still ingesting the slate content and processing it to be available for request and playback.

While media pipeline 112 is used for live events twice during the month, resources are allocated to deploy the media pipeline for the entire month, which are wasted and/or underutilized during slating 101. Furthermore, both of events 103a and 103b must provide the same configuration of the live feed to media pipeline 112. For example, media pipeline 112 may be configured to receive a live feed at a resolution of 1080P and a frame rate of 30 FPS. Thus, the live feed ingested by the media pipeline 112 for both events must be 1080P 30 FPS. If the live feed for event 103b is different, e.g., 720P 30 FPS, the content provider would have to first normalize the live feed to 1080P before providing to the media pipeline 112, which adds additional complexity for the content provider that is undesirable.

FIG. 1B presents an alternative method of ingesting ad hoc event content. In FIG. 1B, there are two events 113a-b that are on October $12^{th}$ and $19^{th}$. 3 days prior to each event, media pipelines 112a and 112b are deployed. Each media pipeline may have different configurations, as discussed further below. Media pipelines 112a and 112b may be deployed based on the scheduled time of events 113a and 113b, respectively. The media pipelines may be deployed days in advance to ensure they are fully operational prior to the event, and the amount of time prior to the event to deploy the media pipeline may vary. During the events the media pipelines may ingest a live feed that is processed and made available for streaming by client devices. At the end of the live event, a notification may be sent that causes the media pipelines to terminate. For example, metadata in the live feed may indicate the event is over. While FIG. 1B shows the media pipelines as terminating when the events are over, in some embodiments the media pipelines may be maintained for a duration after receiving the notification. For example, the media pipeline may be maintained for several hours after the end of the event to allow client devices that are behind the live playhead to finish streaming the event or to support just after broadcast (JAB) streaming of content.

By deploying media pipelines based on the schedule of live events rather than throughout a season, computing resources may be conserved. Rather than allocating resources to be available to ingest content 24/7 and requiring content providers to provide such content, e.g., slate content, resources may be allocated based on when a live event is scheduled. Furthermore, the media pipeline may be torn down and the resources unallocated after the live event. This increases the efficiency of the computers providing the media pipeline by reducing unnecessary resource usage to maintain a media pipeline that isn't being used to ingest and stream live event content.

While two events are shown in FIGS. 1A and 1B, in various embodiments a series of live events are ingested and streamed to client devices. A series of live events may be a season of a sport, such as football. In such embodiments, there may be live events on the weekends and some weekdays, e.g., Monday or Thursday, but for most of the week a football game is not playing. Furthermore, different sports events may have different configurations. For example, a football game between the Seattle Seahawks and the Arizona Cardinals may have more viewers on the west coast, while a football game between the New England Patriots and the Baltimore Ravens may have more viewers on the east coast. Thus, different configurations of a media pipeline may be desirable to provide additional origin servers and/or streaming bandwidth on the west coast or east coast, as desired by a content provider for each game.

Figure 2:
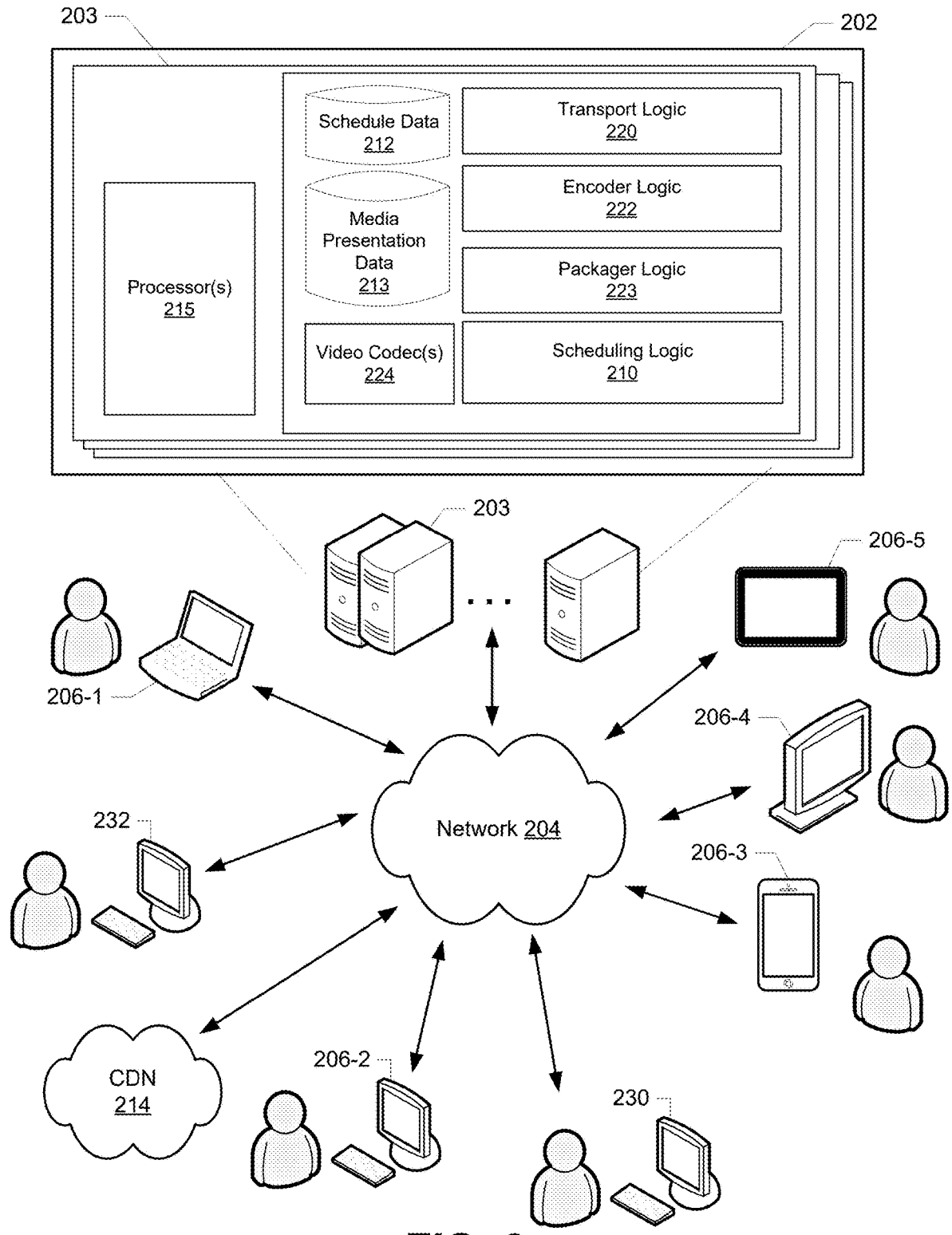
FIG. 2 illustrates a system architecture for streaming of live event content.

FIG. 2 illustrates an example of a computing environment in which a video content service 202 provides streaming content for live events (e.g., video, audio, and/or captions) via network 204 to a variety of client devices (206-1 through 206-5) in accordance with the techniques described herein. In various implementations, the streaming content may be a media presentation of a live event (e.g., a livestream, broadcast, and/or camera feed of an ongoing live event and/or a recording of a partially or fully-completed event which may also be referred to as formerly-live event). Content service 202 may conform to any of a wide variety of architectures such as, for example, a services platform deployed at one or more co-locations, each implemented with one or more servers 203. Servers 203 can include one or more processors 215, memory, and other hardware for performing the tasks disclosed herein. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

Content service 202 may encode (using video codecs 224) captured video of a live event for delivery at different quality-level and bitrate versions of the content, delivered according to a number of streaming protocols including, for example, HTTP Live Streaming (HLS), Dynamic Adaptive Streaming over HTTP (DASH), Sye streaming, and Smooth Streaming. Clients (e.g., device 206-1) consume the live event content using live manifests that are periodically made available by content service 202 as additional content is encoded, packaged, and/or added to the manifest. Fragments of content are then delivered over network 204.

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 202 is described as if it is integrated with or includes the platform(s) that provides media presentations to client devices. However, it will be understood that content service 202 may provide access to media presentations content in conjunction with one or more content delivery networks (e.g., CDN 214) that may or may not be independent of content service 202. In addition, the source(s) of one or both of the primary content and the replacement content may be independent of or integrated to various degrees with content service 202. Implementations are contemplated in which content may be stitched and/or encoded, and/or metadata manipulated by a service that is integrated with a content service (e.g., 202), by a service associated with the content provider, or as a third-party service. The range of variations known to those of skill in the art are contemplated to be within the scope of this disclosure.

Implementations enabled by the present disclosure contemplate logic resident on the client devices consuming video content from content service 202. Client devices may have logic to request alternative audio streams or overlays. Such logic might be part of an existing algorithm or module on the client device or implemented to work in conjunction with such an algorithm or module.

Content service 202 includes scheduling logic 210 that facilitates at least some aspects of content delivery to client devices 206. In some implementations, scheduling logic 210 facilitates providing segments of a live event or VOD content, including video segments and audio segments. Content service 202 may also include transport logic 220. Transport logic 220 facilitates transport of live feed content received from a content provider to various geographically located servers and services. Transport logic handles the transport of a live feed to various servers. For example, a live feed may be received as two different signals, a primary signal and a backup signal. Each of these signals may then be sent to multiple servers to facilitate a failover if the primary signal is interrupted for any reason. Example transport logic includes AWS Elemental MediaConnect available from Amazon Web Services.

Content service 202 may further include encoder logic 222. Encoder logic 222 may prepare assets for playback, including transcoding, implementation of an adaptive bitrate algorithm, and the generation of segments and manifest data. An encoder may be configured based on the properties of the incoming live feed, a bitrate ladder, one or more codecs to use, etc. Example encoder logic includes AWS Elemental MediaLive available from Amazon Web Services.

Content service 202 may also include packager logic 223. Packager logic may generate segments and manifests that conform to various streaming protocols as outlined above. Packager logic may also provide segments to origin servers and CDNs to facilitate faster provision of segments to client devices. Packager logic 223 may also handle routing of requests and delivery of live manifest and segments to client devices, e.g., client device 206. CDN 214 may cache and deliver live manifests and segments to various client devices. Example packager logic includes AWS Elemental MediaPackage available from Amazon Web Services.

Content service 202 may also include a variety of information related to schedule data 212 and media presentation data 213. Schedule data 212 may comprise information about schedules for each channel of a linear playout service, including past, current, and upcoming schedules for a channel. Schedule data 212 may also include information about the start time of a live event and the expected end time of a live event. Media presentation data 213 may include media assets, e.g., mp4 assets as well as encoded and packaged content. Media presentation data 213 may also include ad slates that may be included in a manifest, which may be replaced by dynamically inserted ad content prior to providing the manifest to a client device. Content service 202 can also further include one or more video codecs 224, which may be used to encode media presentations at one or more quality levels that are stored in data store 213. Information may include the schedules, manifests, and associated metadata in data stores 212 and 213 to which service 202 provides access. Alternatively, such information associated with and/or about the content, as well as the content itself may be provided and/or hosted by one or more separate platforms, e.g., CDN 214 or remote cloud storage. It should be noted that, while logic 210, 220, 222, and 223, and data stores 212 and 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Scheduling logic 210 may receive a schedule from content provider 202 that is stored and managed. In some implementations, a schedule may contain a list of programs and secondary content placements. Each program may refer to live events that will be available for playback as part of the channel. Each program may also be associated with a start time and end time, as well as cue points within the program in which to insert secondary content. Secondary content placement, e.g., advertisements, may occur between and within programs. In some implementations secondary content may be defined by a start time and duration. In some implementations, specific secondary content may be inserted, e.g., ad slates, while in other implementations the secondary content may be a marker that is replaced with dynamically inserted advertisements.

In some implementations, segments of live event content may be encoded using different encoding profiles. Some codecs may have numerous encoding parameters (e.g., 30-50), such as, for example, the Advanced Video Coding (AVC), High-Efficiency Video Coding (HEVC), and AOMedia Video 1 (AV1) codecs. Specifically, such codecs utilize encoding profiles having numerous encoding parameters, such as quantization parameters, block size parameters, adaptive encoding optimization parameters, and so forth, with each encoding parameter having either direct or indirect impact on encoding bit rate and quality. It should be noted, however, that the techniques described herein are agnostic to specific codec implementation, and may be employed to configure encoders implemented according to any of a wide variety video compression standards including, for example, Advanced Video Coding (AVC) or H.264, High Efficiency Video Coding (HEVC) or H.265, AV1, VP8, and VP9, as well as future standards, e.g., H.266.

A single encoding profile may not be well-suited for all content. For example, a particular value for an encoding parameter setting such as the quantization parameter may provide a high-quality encoding of content of a first category (e.g., sports broadcasters having relatively little motion). However, content of a second category (e.g., sports events having a relatively higher degree of motion) might not be encoded as well since the parameter settings for high quality encodings vary based on the characteristics of the content, including, but not limited to, levels of motion, spatial details, and encoding complexity. As another example, the default encoding ladder may be well-suited for providing a high-quality encoding of live event content played back on a large display, such as a television, but may be less-suited for providing low-bitrate encodings of live event content to be played back on mobile devices having limited bandwidth capabilities. Therefore, if the default encoding profile is tailored to a first parameter, such as a type of content or type of client device, other content or client devices may have sub-optimal quality and/or result in excessive bitrates.

Thus, in some embodiments, different live event content or different portions of live event content may be encoded using different encoding profiles. In some implementations, multiple encoding profiles are available and optimized for encoding content based on properties of the portion of content to be encoded. For example, sports broadcaster content can be determined by analyzing a video frames and determining a threshold amount of motion vectors between frames. By contrast, sports content might have more motion vectors as the camera pans across a field, players move, etc. Based on the properties of the portion of content, an encoding profile may be selected that optimizes for, e.g., quality or bitrate.

In some implementations, different encoding profiles may be used for different live events as part of the configuration of a media pipeline. For example, a tennis match may have an optimal encoding profile that is different from an optimal encoding profile for a football game. Thus, if a series of live events includes a tennis match and a football game, a media pipeline for the tennis match may use a different encoding profile than a media pipeline for a football game would use.

A configuration for a media pipeline may include a plurality of parameters. Example parameters may include source acquisition protocol (e.g., Zixi push, RTP+FEC, HLS Push, etc.), audio selection (e.g., PID numbers, audio language, display language), caption selection, monitoring (audio silence, macroblocking threshold), availability/redundancy (e.g., which regions to broadcast from and redundant streams for failover), ad insertion (e.g., dynamic ad insertion), playback (e.g., is recording enabled, start-over, trick modes, scrubbing), source attributes (e.g., resolution, format (progressive/interlaced), framerate). In some embodiments, a content provider may send multiple audio/caption streams/PIDs, and a subset of those streams are broadcast for client devices. For example, English and Spanish audio/captions may be received, and only English audio is available for streaming in specific regions or all regions. In some embodiments, one region may have one language audio available for streaming, e.g., English, and a different region has a different language audio available for streaming, e.g., Spanish.

In some embodiments, each media pipeline may have a different configuration. In other embodiments, a series of live events may have a first set of configuration parameters that are static across each live event in the series and a second set of configuration parameters that may be different for each live event. For example, a first set of configuration parameters may be received prior to the first live event in a series of live events. A second set of configuration parameters may be received prior to each live event that provides configuration parameters for that single live event. In some embodiments, a subset of live events of the series of live events may share the same second set of configuration parameters. For example, two live events may be streamed using the same media pipeline.

Figure 3:
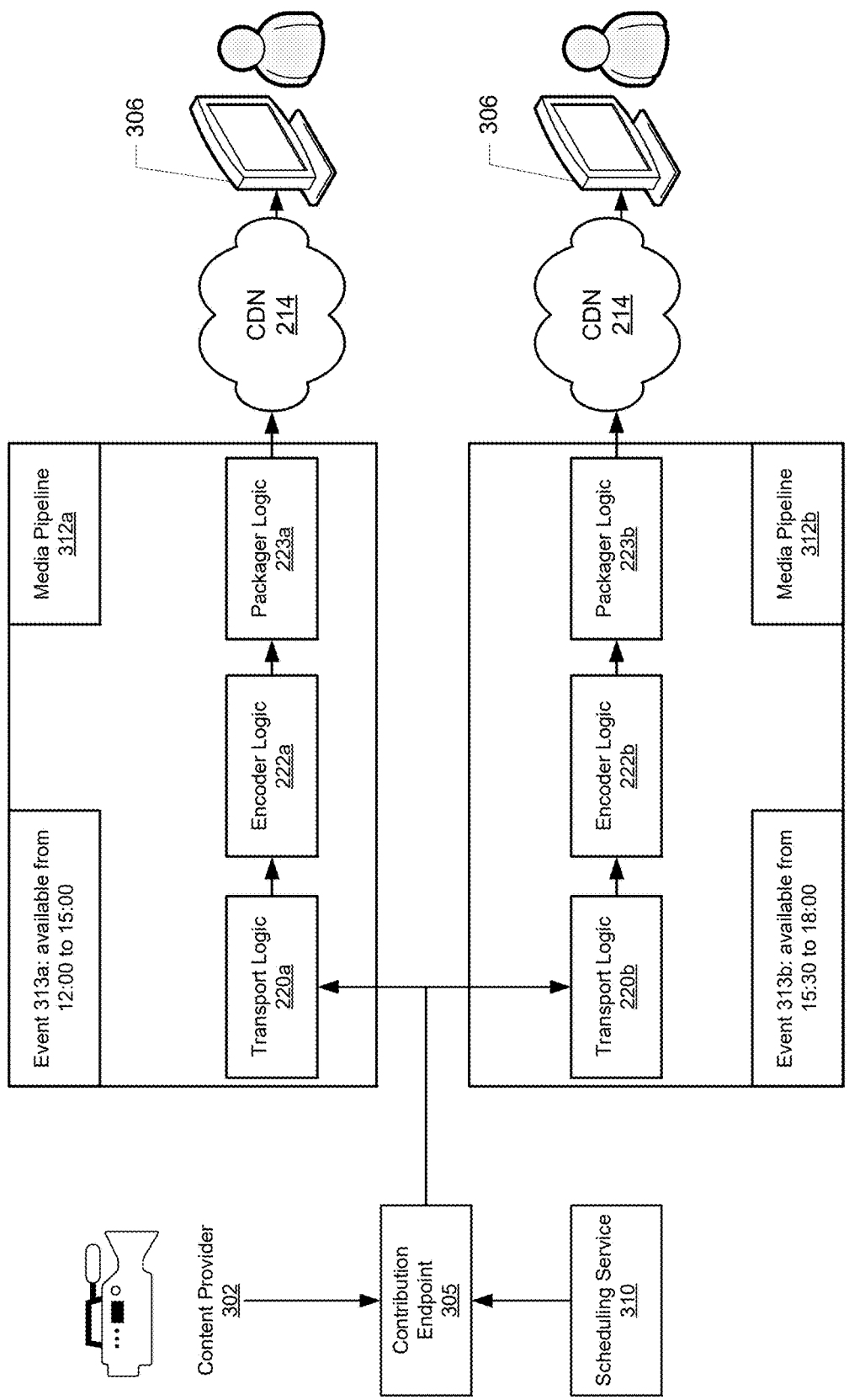
FIG. 3 presents a system architecture for ingesting live feeds into media pipelines.

FIG. 3 presents an architecture of providing ad hoc events using multiple media pipelines. A content provider 202 may capture a live event in a live feed, which is received by contribution endpoint 205. A scheduling service 210 may configure the contribution endpoint 205 to provide the live feed to media pipeline 212a or media pipeline 212b.

The present disclosure also provides techniques for simplifying signal ingestion from content providers. One or more contribution endpoints, e.g., an IP address and port, receives signals from a content provider and routes data to a corresponding media pipeline. In some embodiments, a contribution endpoint may be associated with a single media pipeline. For linear content, e.g., 24/7 content, all content on a channel may be provided to a single contribution endpoint and media pipeline for processing and provision to client devices. Alternatively, a contribution endpoint may be assigned to a content provider, and then the contribution endpoint is associated with different media pipelines based on a schedule. This facilitates a static contribution endpoint for receiving content, but different media pipelines may be used based on the ad hoc event being streamed. Providing a static contribution endpoint for content providers can make sending content easier for a content provider while allowing for different media pipelines to ingest live event content.

Each media pipeline may include a transport logic 220, an encoder logic 222, and a packager logic 223. Transport logic may handle the transport of an ingested signal to the appropriate servers and services, such as encoders. Encoders may handle transcoding of the ingested signal, generating encodings of content at various resolutions, framerates, and bitrates based on an ABR ladder or other techniques. Packagers may handle packaging content according to various streaming protocols, generating segments of media content and associated manifests that may be provided to client devices. Packagers may also handle digital rights management (DRM) implementations. The manifests and segments may then be provided to a client device 206 over a CDN 214.

Each of the transport logic, encoder logic, and packager logic may be configured based on parameters received from a content provider. For example, a content provider may provide details of where the content is to be made available, what encoding ladder to use for content, and what DRM to apply to segments. In some embodiments, a content provider may provide these configurations through an API or other means, which may then be used to deploy infrastructure based on the configuration. In some embodiments, the configuration is provided on a per-event basis, such that each event has a different configuration and thus different media pipeline.

FIG. 3 illustrates media pipelines 312a and 312b for two events 313a and 313b, respectively. As noted above, media pipelines 312a and 312b may be allocated prior to the start of events 313a and 313b. In some embodiments, a leading time before the start of a live event is used. The leading time may be configurable, e.g., 24 hours, 48 hours, 72 hours, or between 1 and 3 days, inclusive, prior to the start time of a live event. During the time 12:00 to 15:00, the contribution endpoint 305 may be connected to media pipeline 312a, including transport logic 220a, encoder logic 222a, and packager logic 223a. During this time, media content is ingested from content provider 302, provided to media pipeline 312a, and then made available for request by client devices 306 over CDN 214. At 15:00, the live event is over and contribution endpoint 305 may be disconnected from media pipeline 312a.

Each of transport logic 220a, encoder logic 222a, and packager logic 223a may be configured based on information associated with live event 313a. In some embodiments, a media pipeline may be identified by a contribution stream ID (CSID), which may be associated with configuration information for that media pipeline.

At 15:30, contribution endpoint 205 may be connected with media pipeline 212b. Media pipeline 212b may correspond to a second event 313b, with transport logic 220b, encoder logic 222b, and packager logic 223b. During the time of event 2, media content is ingested from the content provider 302, provided to media pipeline 312b, and then made available for request by client devices 206 over CDN 214. At 18:00, contribution endpoint 305 may be disconnected from media pipeline 312b. While a single content provider is shown in FIG. 3, different content providers may be providing the live event content for events 313a and 313b. Notably, each of events 313a and 313b may be streamed using a single channel or subscription. In some embodiments, events 313a and 313b are part of a series of live events, e.g., football matches in a division.

After each of events 313a and 313b conclude, media pipelines 312a and 312b may be torn down. Tear down of a media pipeline may include stopping instances of transport logic, encoder logic, and packager logic. Teardown can save resource costs, as otherwise the services are running without any media content to process. As noted above, previously a service may be kept running throughout a season or 24/7 even when live events are not playing. Using the presently disclosed techniques, media pipelines may be configured, deployed, and torn down for each ad hoc event rather than a single media pipeline that requires normalization of configurations from a content provider across ad hoc events.

Transport logic 220a-b, encoder logic 222a-b, and packager logic 223a-b may respectively perform similar functions, but with different configurations. For example, event 1 may be for a Japanese sports event that is ingested with a 25 frame per second (FPS) signal, while event 2 is a Brazilian sports event that is ingested with a 30 fps signal. The servers used for each event may be different, requiring different transport logic to route the ingest signal to the appropriate server and encoder logic. The transcoding will be different based at least on the differences in the ingested signal, but also different ABR encoding ladders may be used for each event. Finally, the packaging of content may differ based on the different viewing habits and capabilities of Japan and Brazil to reduce latency for client devices, for example event 1 expects more client devices requesting content at a 2 Mbps bitrate, while event 2 expects more client devices requesting content at a 800 Kbps bitrate. Thus, more resources may be dedicated to making segments of the 2 Mbps bitrate option available for event 1, while more resources may be dedicated to the 800 Kbps bitrate option for event 2. The different configurations described above are examples, and additional parameters may differ between ad hoc events.

Figure 4:
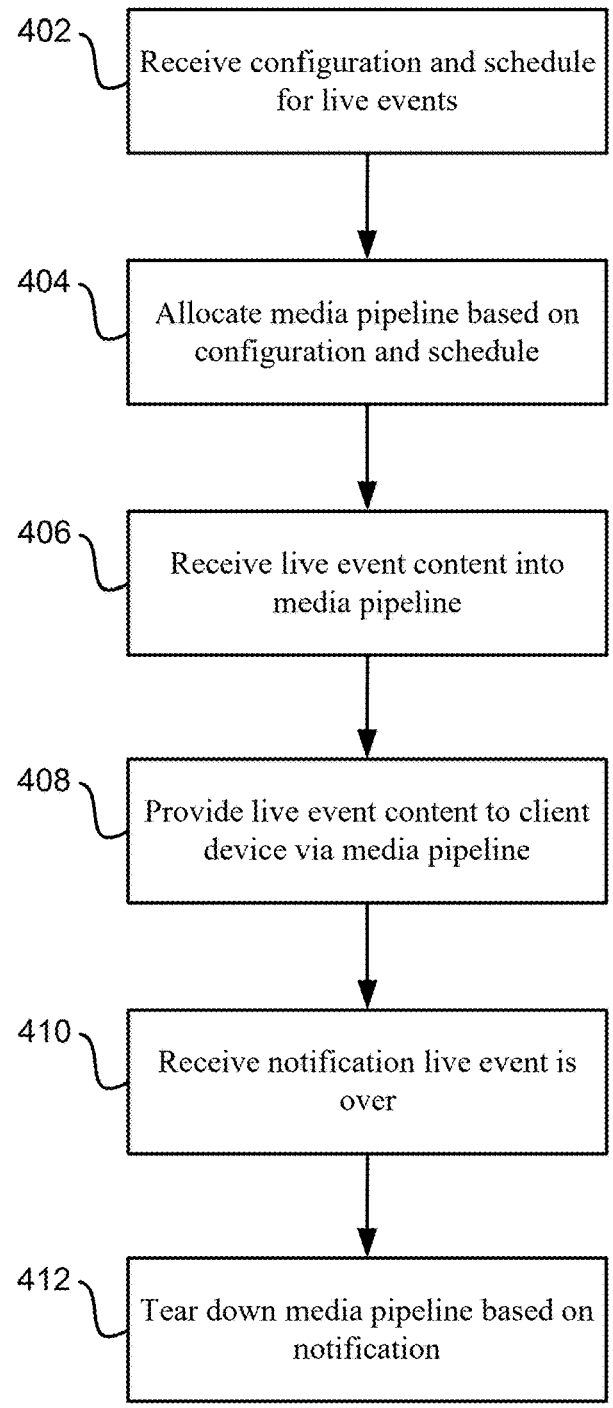
FIG. 4 presents a flowchart illustrating deploying media pipelines for ad hoc events.

FIG. 4 presents a flowchart for using media pipelines for ad hoc events. Configuration and schedule information is received (402). The schedule may describe when an event is being streamed. In some embodiments, the schedule may provide a start and end time for the live event. In some embodiments, the end time is based on an estimated end of the live event. For example, an American football game may last about 3 hours, so the end of the event may be estimated as about 3 hours after the start time.

Configuration information has been described above. Configuration information may include information on how to configure the media pipeline. For example, transport configuration information, encoder configuration information, and packager configuration information. Configuration information may also include what contribution endpoint the content provider will send content to. For example, a content provider may prefer to have one or more static contribution endpoints where they can send media content. When providing information for an ad hoc event, the information may include to which contribution endpoint the content provider will send the live feed. The specified contribution endpoint may then be linked to the appropriate media pipeline for the live event.

Alternatively, the configuration information may not include a contribution endpoint. In such embodiments, a contribution endpoint may be assigned to the live event and provided to the content provider so that the live feed may be sent to the contribution endpoint.

Based on the configuration information and schedule information, a media pipeline is allocated. (404). The allocation of a media pipeline may include configuring a media pipeline, including transport logic, encoder logic, and packager logic. In some embodiments, a media pipeline is allocated based on the start time of the live event indicated in the schedule information. In some implementations, the media pipeline is allocated based on the start time and a leading time offset. The leading time offset may be configurable and be, e.g., one day, two days, or three days. Leading time allows for troubleshooting and monitoring of the media pipeline prior to the live event.

During the live event, live event content is received into the media pipeline (406) and provided to client devices (408). The live event content may have various properties, e.g., resolution or frame rate. The media pipeline is configured to ingest the live event content, transcode it, package it, and provide manifests and segments of content to client devices. In some embodiments, redundant streams of live event content are received. For example, a primary stream and a backup stream may be provided to facilitate failover if the primary stream fails. In such embodiments, a media pipeline may have redundant sets of transport logic, encoder logic, and packager logic to facilitate a backup stream that may be used if the primary stream fails.

A notification that the live event is over may be received (410). In some embodiments, this notification is received via an API or other communication channel from a content provider. In some implementations, a notification may be received in the live feed received from a content provider. For example, a SCTE-35 marker or other stream metadata may indicate that the live event is ended. In some embodiments, the notification is based on the scheduled end of the live event.

The media pipeline may then be torn down based on the notification (412). Tearing down a media pipeline may include freeing up resources allocated to the media pipeline, which may then be allocated to a different service. In some embodiments, the media pipeline may be torn down based on the notification and a trailing offset. A trailing offset may between about 1 and about 6 hours. In some implementations where the notification is based on schedule information, a larger trailing offset may be used to ensure there is sufficient time allotted for the live event to proceed past the scheduled end time. In implementations where the notification is based on metadata in a video stream, the trailing offset may be much less or not used, as the notification more precisely indicates the end of the live event.

In some implementations, streaming sessions may be closed based on the notification. Client devices streaming live event content may continue to request segments after the end of the live event despite no additional segments being available. This can cause problems with the client device's media player and lead to a lower quality of experience for viewers. Thus, a message may be sent to client devices to close a stream or player. In some embodiments, streaming sessions may be closed based on the notification. In some implementations, streaming sessions may be closed based on monitoring of the ingested live feed, and when the live feed is no longer available the streaming session is closed.

In some embodiments, teardown may include tearing down only part of a media pipeline. A media pipeline may include transport logic, encoder logic, and packaging logic, as described above. Encoder logic is typically the most resource intensive, consuming significantly more resources to maintain than transport or packaging logic. Thus, in some embodiments, the encoder logic may be torn down while the transport and packaging logic are not torn down. This may be particularly advantageous when the transport logic and packaging logic have static configurations across multiple live events, but the encoder logic may have different configurations, e.g., a different ABR ladder. Thus, in some embodiments, a first media pipeline and a second media pipeline may have the same configurations for the transport and packaging logic, but different configurations for the encoder logic.

In some embodiments, teardown may include hibernating one or more logics described above, or hibernating may be performed as an alternative to tear down. Hibernating and tear down may be distinguished based upon how computing resources are allocated and availability of those resources. When a media pipeline is deployed, it is configured to receive a live feed and perform transport, encoding, and packaging of the live feed. The media pipeline can ingest and process a signal at any time while deployed. During hibernation, one or more logics within a media pipeline may be unavailable for use but resources for that logic, e.g., memory and processors, are still allocated to the media pipeline. Thus, if a signal is received while an encoder logic is in hibernation, encoding of that logic is not possible until the encoder logic is taken out of hibernation. Tear down, by contrast, deletes the logic so that the memory and processors may be used for a different purpose, e.g., a different media pipeline. If encoder logic is torn down in a media pipeline, then a new instance of the encoder logic must be deployed for the media pipeline, including providing configuration parameters for the newly deployed encoder logic.

Hibernating one or more logics within a media pipeline reduces resources costs, e.g., computational resources such as memories and processors, compared to keeping a media pipeline deployed. Hibernating also saves deployment costs compared to tear down, as the logic is already configured and assessed to function as intended. Thus, in some embodiments, one or more logics may be hibernated instead of torn down. This may be particularly advantageous when some logic of the pipeline, e.g., an encoder, may have the same configuration across live events but keeping an encoder deployed for the entire period between live events is costly.

In embodiments where one or more logics in a media pipeline are hibernated instead of torn down, operation 404 may include "waking" hibernated logic rather than allocating a media pipeline. In some embodiments, one or more logics may be woken, while other logic may be newly allocated. For example, encoder logic may be newly deployed for a new live event, while transport logic may be hibernated and then woken up for two or more live events.

The process of FIG. 4 may be repeated for additional live events. In some embodiments, a series of live event corresponds to a season of a sport, e.g., sports games between teams in a single organization. For each live event in the series, a different set of configurations may be received and associated with a different CSID for each live event. In some embodiments, a series of live events may share one or more configuration values while other configuration values are modified between live events. For example, an English audio and Spanish audio option may be provided for all live events, but each live event may have a different allocation of origin servers based on estimations of bandwidth requirements in various geographical areas.

Figure 5:
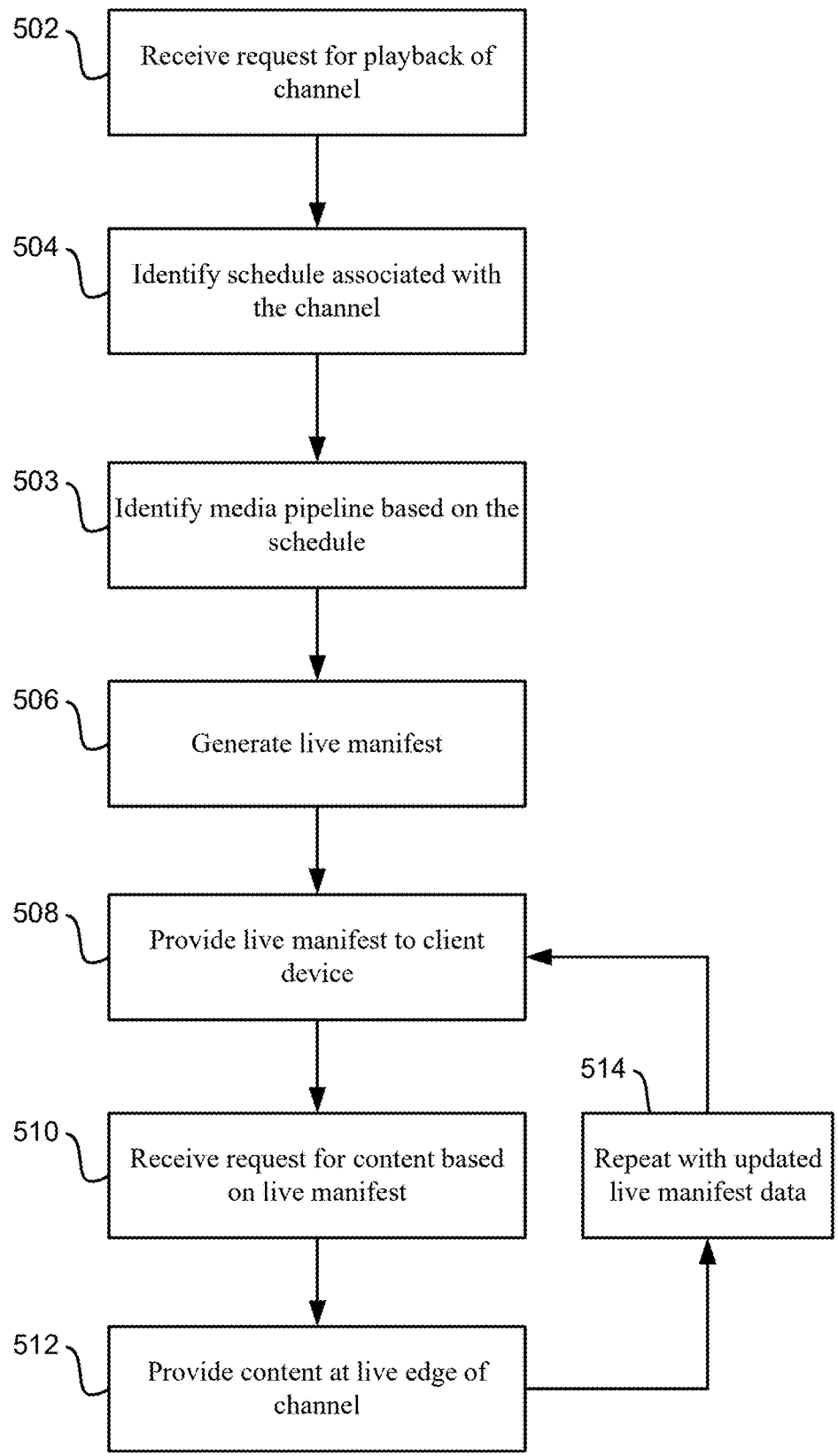
FIG. 5 presents a flowchart illustrating providing segments of an ad hoc event to a client device.

FIG. 5 presents a flowchart for a playback of ad hoc live events by a client device. A request for playback of a channel is received (502). The schedule associated with the channel is identified (504). In some implementations, a portion of a schedule corresponding to the current time is identified. The portion of the schedule may describe the content to provide to client devices for the current time, including a specific portion of the content to be provided.

A live manifest is generated based on the schedule (506). In some implementations, the live manifest includes timing metadata defining when a segment should be played back. The timing metadata enables synchronized playback of content across client devices playing back the same channel. In some implementations, the live manifest includes references to secondary content placements and live event content.

In some implementations, a live manifest may include references to two-second segments of content. In some implementations, a live manifest may include references to longer segments, e.g., more than ten second segments or more than 30 second segments.

In some embodiments, a live manifest may include a discontinuity marker (for DASH) or similar marker between references to segments. A discontinuity marker may be used to indicate a change in content properties. For example, a sports analyst may discuss a live sporting event prior to the event. This type of content typically has little movement, and thus may be streamed at a low bitrate, e.g., 30 frames per second. The live sporting event, however, may have fast movement and thus a high bitrate is desirable, e.g., 50 or 60 fps. A discontinuity marker may be added to the manifest to enable a client device to switch between the different segment properties without deteriorating the quality of experience for a viewer. Including a discontinuity marker in a live manifest may allow a client device to seamlessly transition to playback of content having different properties.

The live manifest is provided to client devices (508), and a request for content based on the live manifest is received (510). Content at the live edge is provided (512). As the channel is a live stream and using a live manifest, the live manifest may include metadata defining a live head for the channel to synchronize content playback across client devices. Furthermore, updated live manifest data may be provided to provide references for the next segment to be played back (514). In some embodiments, timing information included in the manifest may define which segment should be played back, and trick modes such as fast forward may be disabled. Thus, assuming the first segment is synchronized, playback of content may progress without needing to update a live manifest with each segment.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising:
one or more processors; and
one or more memories storing computer-executable instructions that, when executed by the one or more processors, configure the one or more processors for:
receiving, for each of a first live event and a second live event, media pipeline configuration information and schedule information, wherein the schedule information includes a first start time for the first live event and a second start time for the second live event;
allocating a first media pipeline based on the media pipeline configuration information at a leading time before the start time of the first live event, wherein the first media pipeline includes transport logic, one or more encoders, and one or more packagers;
receiving first live event content to the first media pipeline at a contribution endpoint;
providing segments of the first live event content to client devices;
receiving a first notification that the first live event is over;
tearing down the first media pipeline based on the first notification;
allocating a second media pipeline based on the media pipeline configuration information at a leading time before the start time of the second live event, wherein the second media pipeline includes transport logic, one or more encoders, and one or more packagers;
receiving second live event content to the second media pipeline at the contribution endpoint;
providing segments of the second live event content to client devices;
receiving a second notification that the second live event is over; and
tearing down the second media pipeline based on the second notification.

2. The system of claim 1, wherein the first notification is part of a video stream.

3. The system of claim 1, wherein the first media pipeline and the second media pipeline have different configurations of the live event content ingest service, one or more encoders, one or more packagers, or any combinations thereof.

4. A system, comprising:
one or more processors; and
one or more memories storing computer-executable instructions that, when executed by the one or more processors, configure the one or more processors for:
receiving media pipeline configuration information and schedule information for a first live event of a series of live events, wherein the schedule information for the first live event indicates a start time of the first live event;
allocating a first media pipeline based on the media pipeline configuration information at a leading time before the start time of the first live event;
receiving first live event content to the first media pipeline;
receiving a first notification that the first live event is over; and
tearing down the first media pipeline based on the first notification.

5. The system of claim 4, wherein the first notification is included in the first live event content.

6. The system of claim 4, wherein the first notification is based on the schedule information.

7. The system of claim 4, wherein the first notification is received via an application programming interface (API).

8. The system of claim 4, wherein the computer-executable instructions include additional instructions to configure the one or more processors for closing streaming sessions on client devices based on the first notification.

9. The system of claim 4, wherein the leading time is configurable.

10. The system of claim 4, wherein tearing down the first media pipeline is performed at a trailing time after receiving the first notification.

11. The system of claim 10, wherein the trailing time is configurable.

12. The system of claim 4, wherein the first media pipeline includes a live event content ingest service, one or more encoders, and one or more packagers.

13. A method, comprising:
receiving media pipeline configuration information and schedule information for a first live event of a series of live events, wherein the schedule information for the first live event indicates a start time of the first live event;
allocating a first media pipeline based on the media pipeline configuration information at a leading time before the start time of the first live event;
receiving first live event content to the first media pipeline;
receiving a first notification that the first live event is over; and
tearing down the first media pipeline based on the first notification.

14. The method of claim 13, further comprising:
receiving media pipeline configuration information and schedule information for a second live event, wherein the schedule information for the second live event indicates a start time of the second live event;
allocating a second media pipeline based on the media pipeline configuration information at the leading time before the start time of the second live event; and
receiving second live event content to the second media pipeline;
receiving a second notification that the second live event is over; and
tearing down the second media pipeline based on the second notification.

15. The method of claim 14, wherein the first media pipeline is associated with a contribution stream ID (CSID), each CSID associated with media pipeline configuration information, wherein the method further comprises associating the CSID with the first live event and a second live event.

16. The method of claim 14, wherein the first live event content and the second live event content have different configurations.

17. The method of claim 16, wherein the different configurations comprise source acquisition protocol, caption selection, audio selection, source attributes, ABR ladders, or any combination thereof.

18. The method of claim 14, further comprising:
providing segments of the first live event content to a first client device; and
providing segments of the second live event content to a second client device.

19. The method of claim 14, wherein the first live event content and the second live event content are received at a contribution endpoint, and wherein method further comprises:
- prior to the start time of the first live event, connecting the contribution endpoint to the first media pipeline; and
- after the first live event is over and prior to the start time of the second live event, disconnecting the contribution endpoint from the first media pipeline and connecting the contribution endpoint to the second media pipeline.

20. The method of claim 14, wherein segments of the first live event content and segments of the second live event content are available for streaming via a single channel of linear playout.

\* \* \* \* \*